(12) United States Patent
Denis et al.

(10) Patent No.: US 11,351,749 B2
(45) Date of Patent: *Jun. 7, 2022

(54) WASHABLE, WATERPROOF, SEALABLE AND REUSABLE STORAGE BAGS

(71) Applicant: BlueAvocado, Co., Austin, TX (US)

(72) Inventors: Alain R. Denis, Cedar Park, TX (US); Amy George, Austin, TX (US)

(73) Assignee: BLUEAVOCADO, CO., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,558

(22) Filed: Sep. 21, 2020

(65) Prior Publication Data

US 2021/0001585 A1    Jan. 7, 2021

Related U.S. Application Data

(60) Continuation of application No. 15/997,360, filed on Jun. 4, 2018, now Pat. No. 10,780,666, which is a
(Continued)

(51) Int. Cl.
*B65D 33/00* (2006.01)
*B31B 70/81* (2017.01)
(Continued)

(52) U.S. Cl.
CPC .......... *B31B 70/8131* (2017.08); *B29C 65/02* (2013.01); *B29C 66/1122* (2013.01);
(Continued)

(58) Field of Classification Search
CPC .. B29C 66/232; B65D 31/10; B65D 33/2566; B31B 2150/00; B31B 2160/20; B29L 2005/00; B29L 2031/7128
(Continued)

(56) References Cited

U.S. PATENT DOCUMENTS 4,055,109 A   10/1977 Kan
4,586,319 A   5/1986 Ausnit
(Continued)

FOREIGN PATENT DOCUMENTS

CN    1681709    10/2005
CN    101160242   4/2008
(Continued)

OTHER PUBLICATIONS

Office Action issued for Chinese Patent Application No. 201910312924.8, dated Feb. 20, 2021, 10 pages.
(Continued)

*Primary Examiner* — Peter N Helvey
(74) *Attorney, Agent, or Firm* — Sprinkle IP Law Group

(57) ABSTRACT

Disclosed are embodiments of a versatile storage bag and methods of making same. The versatile storage bag may have first and second sidewalls, a double-locking closure mechanism with a first closure element extending along the first sidewall and a second closure element extending along the second sidewall, each closure element having a channel and an elongated member configured for interlocking with one another. A double-seal along three sides of the first sidewall and the second sidewall form a gusset between two seals, leaving an opening through the double-locking closure mechanism. Corner seals may be formed at the corners of the first and second sidewalls, further reinforcing the double-locking closure mechanism for an airtight and hence waterproof seal. The versatile storage bag may be made of a food-grade polyethylene vinyl acetate blend, approximately 90% or less ethylene vinyl acetate and approximately 10% or less polyethylene.

20 Claims, 13 Drawing Sheets

Related U.S. Application Data division of application No. 14/598,475, filed on Jan. 16, 2015, now Pat. No. 10,000,033.

(60) Provisional application No. 61/928,575, filed on Jan. 17, 2014.

(51) Int. Cl.

| | | |
|---|---|---|
| *B65D 30/20* | (2006.01) | |
| *B65D 33/25* | (2006.01) | |
| *B29C 65/00* | (2006.01) | |
| *B29C 65/02* | (2006.01) | |
| *B31B 70/26* | (2017.01) | |
| *B31B 70/64* | (2017.01) | |
| *B31B 150/00* | (2017.01) | |
| *B31B 160/20* | (2017.01) | |
| *B31B 160/10* | (2017.01) | |
| *B29L 31/00* | (2006.01) | |
| *B29L 5/00* | (2006.01) | |
| *B29C 65/58* | (2006.01) | |
| *B29K 105/00* | (2006.01) | |
| *B29K 105/26* | (2006.01) | |
| *B29C 65/04* | (2006.01) | |
| *B29K 23/00* | (2006.01) | |

(52) U.S. Cl.
CPC .......... *B29C 66/232* (2013.01); *B29C 66/244* (2013.01); *B29C 66/3452* (2013.01); *B29C 66/43* (2013.01); *B29C 66/8167* (2013.01); *B29C 66/81431* (2013.01); *B29C 66/8511* (2013.01); *B31B 70/26* (2017.08); *B65D 31/10* (2013.01); *B65D 33/2566* (2013.01); *B29C 65/04* (2013.01); *B29C 65/58* (2013.01); *B29C 66/1282* (2013.01); *B29C 66/12421* (2013.01); *B29C 66/12461* (2013.01); *B29C 66/12841* (2013.01); *B29C 66/14* (2013.01); *B29C 66/524* (2013.01); *B29C 66/71* (2013.01); *B29C 66/73713* (2013.01); *B29C 66/73921* (2013.01); *B29C 66/81423* (2013.01); *B29K 2023/083* (2013.01); *B29K 2023/12* (2013.01); *B29K 2105/0088* (2013.01); *B29K 2105/26* (2013.01); *B29L 2005/00* (2013.01); *B29L 2031/7128* (2013.01); *B29L 2031/7282* (2013.01); *B31B 70/64* (2017.08); *B31B 2150/00* (2017.08); *B31B 2160/10* (2017.08); *B31B 2160/102* (2017.08); *B31B 2160/20* (2017.08); *Y02W 30/80* (2015.05); *Y10T 156/10* (2015.01)

(58) Field of Classification Search
USPC ........................................................ 383/63
See application file for complete search history.

(56) References Cited

U.S. PATENT DOCUMENTS

| | | | |
|---|---|---|---|
| 4,637,063 | A | 1/1987 | Sullivan et al. |
| 5,368,394 | A | 11/1994 | Scott et al. |
| 5,542,766 | A | 8/1996 | Cadwallader |
| 5,826,401 | A | 10/1998 | Bois |
| 5,826,723 | A | 10/1998 | Jaszai |
| 5,839,831 | A | 11/1998 | Mazzocchi |
| 6,068,585 | A | 5/2000 | Ouchi |
| 6,186,933 | B1 | 2/2001 | DeMatteis |
| 6,467,956 | B1 | 10/2002 | Tilman et al. |
| 6,517,660 | B2 | 2/2003 | Ausnit |
| 6,568,852 | B1 | 5/2003 | Godshaw et al. |
| 6,686,005 | B2 | 2/2004 | White et al. |
| 6,814,491 | B1 | 11/2004 | Tang |
| 6,843,600 | B2 | 1/2005 | Tilman et al. |
| 6,899,460 | B2 | 5/2005 | Turvey et al. |
| 6,986,237 | B2 | 1/2006 | Ausnit |
| 7,305,742 | B2 | 12/2007 | Anderson |
| 7,490,989 | B2 | 2/2009 | Kobetsky et al. |
| 7,674,040 | B2 | 3/2010 | Dowd et al. |
| 7,784,160 | B2 | 8/2010 | Dais |
| 7,857,515 | B2 | 12/2010 | Dais et al. |
| 7,886,412 | B2 | 2/2011 | Dais et al. |
| 8,196,269 | B2 | 6/2012 | Dais et al. |
| 8,197,139 | B2 | 6/2012 | Turvey et al. |
| 8,293,348 | B2 | 10/2012 | Yuno et al. |
| 8,308,021 | B2 | 11/2012 | Turvey et al. |
| 8,414,465 | B2 | 4/2013 | Totani |
| 8,469,593 | B2 | 6/2013 | Price et al. |
| 8,474,623 | B2 | 7/2013 | Villarrubia |
| 8,568,031 | B2 | 10/2013 | Price et al. |
| 8,578,572 | B2 | 11/2013 | Ackerman et al. |
| 8,622,616 | B2 | 1/2014 | Petkovsek |
| D753,444 | S | 4/2016 | Denis |
| 10,000,033 | B2 | 6/2018 | Denis et al. |
| 10,780,666 | B2 | 9/2020 | Denis et al. |
| 11,097,505 | B2 | 8/2021 | Denis et al. |
| 2004/0120613 | A1 | 6/2004 | Hanson |
| 2004/0131285 | A1 | 7/2004 | Shepard et al. |
| 2004/0136615 | A1 | 7/2004 | Tilman et al. |
| 2004/0258332 | A1 | 12/2004 | Totani |
| 2005/0063616 | A1 | 3/2005 | Chang |
| 2005/0271308 | A1 | 12/2005 | Pawloski |
| 2005/0272583 | A1 | 12/2005 | Totani |
| 2006/0104550 | A1 | 5/2006 | Kuge et al. |
| 2006/0165316 | A1 | 7/2006 | Chueng |
| 2006/0196784 | A1 | 9/2006 | Murray |
| 2007/0047850 | A1 | 3/2007 | Keith et al. |
| 2007/0110340 | A1 | 5/2007 | Buchman |
| 2007/0116387 | A1 | 5/2007 | Hui et al. |
| 2008/0159662 | A1 | 7/2008 | Dowd et al. |
| 2010/0323868 | A1 | 12/2010 | Miyamoto et al. |
| 2011/0069911 | A1 | 3/2011 | Ackerman et al. |
| 2011/0299797 | A1 | 12/2011 | Petkovsek |
| 2012/0047852 | A1 | 3/2012 | Greco et al. |
| 2015/0202832 | A1 | 7/2015 | Denis et al. |
| 2015/0203250 | A1 | 7/2015 | Denis et al. |
| 2018/0281334 | A1 | 10/2018 | Denis et al. |
| 2022/0040951 | A1 | 2/2022 | Denis et al. |

FOREIGN PATENT DOCUMENTS

| | | |
|---|---|---|
| CN | 101595040 | 12/2009 |
| EP | 1593609 | 11/2005 |
| JP | 2006206106 | 8/2006 |
| WO | WO2004026702 | 4/2004 |
| WO | WO2008092123 | 7/2008 |

OTHER PUBLICATIONS

Office Action issued for Chinese Divisional Application No. 201910312924.8, dated Sep. 4, 2020, 19 pages.

Office Action issued for U.S. Appl. No. 14/598,511, dated Sep. 18, 2020, 10 pages.

International Search Report and Written Opinion issued for PCT Patent Application No. PCT/US2015/011823, dated May 11, 2015, 8 pgs.

Office Action for U.S. Appl. No. 14/598,475, dated May 24, 2016, 9 pgs.

Office Action for U.S. Appl. No. 14/598,511, dated Jul. 22, 2016, 9 pgs.

International Preliminary Report on Patentability (IPRP) issued for PCT Patent Application No. PCT/US2015/011823, dated Jul. 28, 2016, 7 pgs.

Office Action for U.S. Appl. No. 14/598,475, dated Oct. 5, 2016, 11 pgs.

Office Action for U.S. Appl. No. 14/598,511, dated Jan. 19, 2017, 9 pgs.

"Full Circle Product Line," 2013 Full Circle Home LLC, New York, NY, 1 pg.

(56) References Cited

OTHER PUBLICATIONS

Office Action for U.S. Appl. No. 14/598,511, dated May 9, 2017, 10 pgs.
Office Action issued for U.S. Appl. No. 14/598,475, dated Jul. 27, 2017, 11 pgs.
European Search Report issued for European Patent Application No. 15737407.5, dated Sep. 5, 2017, 8 pgs.
Office Action for U.S. Appl. No. 14/598,511, dated Nov. 6, 2017, 10 pgs.
Office Action for Chinese Patent Application No. 201580009921.7, dated Jan. 19, 2018, 17 pgs.
Office Action for U.S. Appl. No. 14/598,511, dated Feb. 9, 2018, 10 pgs.
Examiner's Report issued for Canadian Patent Application No. 2,937,105, dated Feb. 6, 2018, 3 pgs.
Notice of Allowance for U.S. Appl. No. 14/598,475, dated Feb. 20, 2018, 6 pgs.
Final Office Action issued for U.S. Appl. No. 14/598,511, dated Jul. 19, 2018, 9 pages.
Office Action issued for Chinese Patent Application No. 201580009921.7, dated Sep. 29, 2018, 3 pages.
Office Action issued for U.S. Appl. No. 14/598,511, dated Dec. 31, 2018, 9 pages.
Office Action issued in U.S. Appl. No. 15/997,360, dated Mar. 22, 2019, 13 pages.
Office Action issued for U.S. Appl. No. 14/598,511, dated Jun. 20, 2019, 9 pages.
Office Action issued for U.S. Appl. No. 15/997,360, dated Aug. 16, 2019, 10 pages.
Office Action issued for U.S. Appl. No. 15/997,360, dated Jan. 31, 2020, 10 pages.
Office Action issued for U.S. Appl. No. 14/598,511, dated Jan. 15, 2020 pages.
Office Action issued for U.S. Appl. No. 14/598,511, dated Apr. 30, 2020, 6 pages.
Notice of Allowance issued for U.S. Appl. No. 15/997,360, dated May 8, 2020, 5 pages.

WASHABLE, WATERPROOF, SEALABLE AND REUSABLE STORAGE BAGS

CROSS-REFERENCE TO RELATED APPLICATIONS

This application is a continuation of, and claims a benefit of priority under 35 U.S.C. § 120 from U.S. patent application Ser. No. 15/997,360, filed Jun. 4, 2018, entitled, "WASHABLE, WATERPROOF, SEALABLE AND REUSABLE STORAGE BAGS," which is a divisional application of U.S. patent application Ser. No. 14/598,475, filed Jan. 16, 2015, entitled "WASHABLE, WATERPROOF, SEALABLE AND REUSABLE STORAGE BAGS," issued as U.S. Pat. No. 10,000,033, which claims a benefit of priority from U.S. Provisional Application No. 61/928,575, filed Jan. 17, 2014, entitled "WASHABLE, WATERPROOF, SEALABLE AND REUSABLE STORAGE BAGS." This application relates to U.S. patent application Ser. No. 14/598,511, filed Jan. 16, 2015, entitled "WASHABLE, WATERPROOF, SEALABLE AND REUSABLE SOFT GUSSETED VOLUMIZED STORAGE BAGS," which claims a benefit of priority from U.S. Provisional Application No. 61/928,579, filed Jan. 17, 2014, entitled "WASHABLE, WATERPROOF, SEALABLE AND REUSABLE SOFT GUSSETED VOLUMIZED STORAGE BAGS." All applications referenced in this paragraph are incorporated by reference herein in their entireties.

TECHNICAL FIELD

This disclosure relates generally to storage containers. More particularly, embodiments disclosed herein relate to lightweight, sealable, and reusable storage containers, useful in a variety of container categories, including food, travel, and organization.

BACKGROUND OF THE RELATED ART

Today's food storage containers generally fall into two classes: either bulky and reusable, or lightweight but designed for single-use disposable options. The former is either a glass item that offers toxin-free storage, but is heavy to carry, or a plastic container, that may have toxins and still may be too bulky for practical uses. The lightweight alternatives are often disposable style bags with a sealed closure, but are made of a material and/or design specific for single use purposes. While some customers do wash and reuse, these lightweight disposable style bags tend to deteriorate and/or fall apart rather quickly after first use. Furthermore, they are not designed to withstand multiple cleanings in the dishwasher or washing machine.

Examples of various storage containers can be found in U.S. Pat. No. 8,578,572, entitled "CLOSURE MECHANISM AND METHOD OF CLOSING"; U.S. Pat. No. 8,568,031, entitled "CLICKING CLOSURE DEVICE FOR A RECLOSABLE BAG"; U.S. Pat. No. 8,308,021, entitled "DISPOSABLE STORAGE CONTAINER"; U.S. Pat. No. 8,469,593, entitled "RECLOSABLE BAG HAVING A PRESS TO VENT ZIPPER"; U.S. Pat. No. 5,542,766, entitled "WATERPROOF CLOSURE SEAL FOR BAGS, CLOTHING AND OTHER USES", U.S. Pat. No. 8,196,269, entitled "CLOSURE MECHANISM FOR A RECLOSABLE POUCH", U.S. Pat. No. 8,474,623, entitled "ECOLOGICAL SNACK BAG"; U.S. Pat. No. 7,857,515, entitled "AIRTIGHT CLOSURE MECHANISM FOR A RECLOSABLE POUCH"; U.S. Pat. No. 8,197,139, entitled "VALVE AND VALVE STRIP FOR A RECLOSABLE CONTAINER"; and U.S. Pat. No. 8,308,021, entitled "DISPOSABLE STORAGE CONTAINER".

These and other storage containers currently available on the market suffer some or all the aforementioned drawbacks and/or lack certain desirable properties such as lightweight, flexibility, washability, sealability, reusability, durability, etc. Consequently, there is room for innovations and improvements in the field of storage containers.

SUMMARY OF THE DISCLOSURE

Embodiments disclosed herein are directed to lightweight, flexible, washable, sealable, reusable, reclosable, and durable storage containers and methods of manufacturing same. In some embodiments, such a storage container may be referred to herein as a versatile pouch or storage bag.

In some embodiments, such a versatile storage bag can include or otherwise incorporate freshness and watertight properties desirable in food and travel storage, addressing a particular need in the art for a food grade durable, reliable, washable, and sealable storage bag.

In some embodiments, the versatile storage bag can be made of a thermoplastic material such as food safe, FDA-grade polyethylene vinyl acetate (PEVA) blend of ethylene vinyl acetate (EVA) and polyethylene (PE). The ratio of EVA/PE may vary from implementation to implementation, depending upon the desired properties such as stiffness, flexibility, tear resistance, heat resistance, heat retention, etc. In some embodiments, the ratio of EVA/PE in the material of a versatile storage bag may range from, for instance, approximately 9 parts of EVA to one part of PE to approximately 7 parts of EVA to 3 parts of PE. Those skilled in the art will appreciate that different ratios of EVA/PE may be used. Those skilled in the art will also appreciate that other materials may be used and/or added. In some embodiments, the material of the versatile storage bag may have a minimum thickness configured for allowing hot and cold water washing as well as for multiple reuses. In some embodiments, the versatile storage bag can be machine washed multiple times in high-heat, providing a highly desirable reusability.

In some embodiments, the entire versatile storage bag can be made of the same material, including a unique closure mechanism that significantly improves the sealability over prior storage containers. In some embodiments, the versatile storage bag can be made of two or more materials, with the closure mechanism of the versatile storage bag having a first ratio of EVA/PE and a body of the versatile storage bag having a second ratio of EVA/PE such that the body of the versatile storage bag is more flexible than the closure mechanism.

Numerous other materials and combinations thereof may also be suitable for implementing embodiments of a versatile storage bag disclosed herein.

In some embodiments, the closure mechanism of a versatile storage bag disclosed herein can include a pair of closure elements located on two sides of the versatile storage bag. The first closure element may include a channel and an elongated member extending along a base of the first closure element. The second, complementary closure element may include an elongated member and a channel extending along a base of the second closure element. Each channel may have a cross-sectional profile resembling a pair of arms extending from a body. Each elongated member may have a cross-sectional profile resembling a stud or post.

The cross-sectional profile of the channel is configured to allow the channel to, when pressed, extend to each side of the elongated member to thereby lock with the elongated member. Both elongated members may have a textured or shaped surface to lock and seal in their corresponding channels and the channels can fully and securely receive their corresponding elongated members to lock and thereby create an airtight (and hence waterproof) seal which, in some embodiments, may be referred to as a "double-lock."

In some embodiments, a method of making a versatile storage bag may include a) manipulating a first material using a first tool to create a first portion having at least a first closure element, the first closure element having a channel and an elongated member extending along a base of the first closure element; b) manipulating a second material using a second tool to create a second portion having a flat or substantially flat surface; c) joining the first portion and the second portion to create a first sidewall with the first closure element; d) creating a complementary first portion having a second closure element, the second closure element having an elongated member and a channel extending along a base of the second closure element; e) joining the complementary first portion and a complementary second portion to create a second sidewall with the second closure element; f) aligning the first sidewall and the second sidewall such that the first closure element and the second closure element together form a double-locking closure mechanism; and g) forming double seals along three sides of the first sidewall and the second sidewall, leaving an opening through the double-locking closure mechanism.

In some embodiments, the method may further comprise forming a first corner seal at a first corner and a second corner seal at a second corner of the versatile storage bag. These corner seals can reinforce the double-locking closure mechanism and overall strength and durability of the versatile storage bag.

In some embodiments, reusability of the versatile storage bag is significantly improved over prior storage containers due at least in part to the double-seal construction along the edges of the versatile storage bag. Multiple welded seams with a double wall spacer allow for additional strength on the edges of the versatile storage bag.

With healthier living trends from portion control, to toxin/Bisphenol A (BPA) free and waste-free lunch, consumers need a lightweight, durable alternative that allows for daily reuses and washes. Embodiments of a versatile storage bag disclosed herein can address this need and more. For example, it allows customers to carry lots of small snack bags in their lunch box, purse or brief case, keeping them airtight and fresh, while not requiring a lot of space. Moreover, it allows customers to adhere to bans and trends for waste-free or boomerang lunch, as it can easily be washed and reused multiple times. Finally, its reusability is not only convenient, but also saves money, replacing dozens of single use bags and containers alike.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Figure 1:
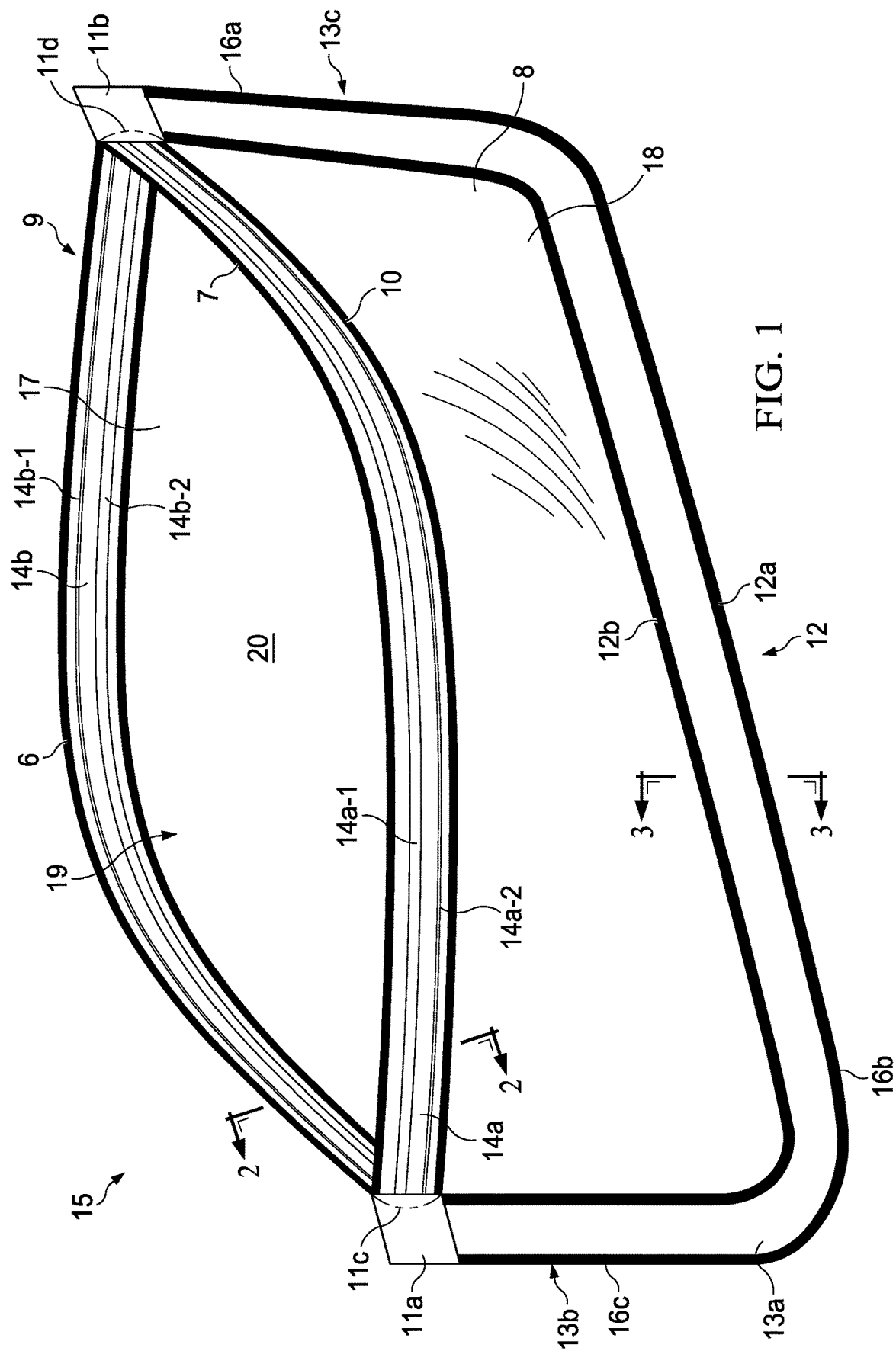
FIG. 1 depicts an isometric view of an example embodiment of a versatile storage bag with a double-locking closure mechanism, double-seal edges, and reinforced corners.

Referring to FIG. 1, versatile storage bag 15 of material 8 according to one non-limiting example embodiment may include first and second sidewalls 17 and 18, opening 19, ends 13b, 13c joined around edges or sides 16a-16c, and gusset 13a defined by seals 12a and 12b. Closure mechanism 9 may have first closure element 14a and second closure element 14b on sides 6 and 7. First closure element 14a and second closure element 14b may extend from first corner 11a to second corner 11b and may join first and second sidewalls 17, 18 via seam 10 on either side proximate opening 19. In some embodiments, first closure element 14a may include channel 14a-1 and elongated member 14a-2. In some embodiments, second closure element 14b may include elongated member 14b-1 and channel 14b-2.

Closure mechanism 9, first and second sidewalls 17, 18, and double-seal 12 define storage means interior space 20. As explained below, when closure mechanism 9 is fully sealed across opening 19, storage bag 15 can provide an airtight seal such that content in interior space 20 may be maintained for a desired period of time, such as days, months, or years. In some embodiments, when fully sealed, storage bag 15 can withstand at least 10 pounds of pressure or higher, for instance, up to 35 pounds of pressure. In one embodiment, storage bag 15 can be approximately 8.5"× 4.75" in size.

Figure 2A:
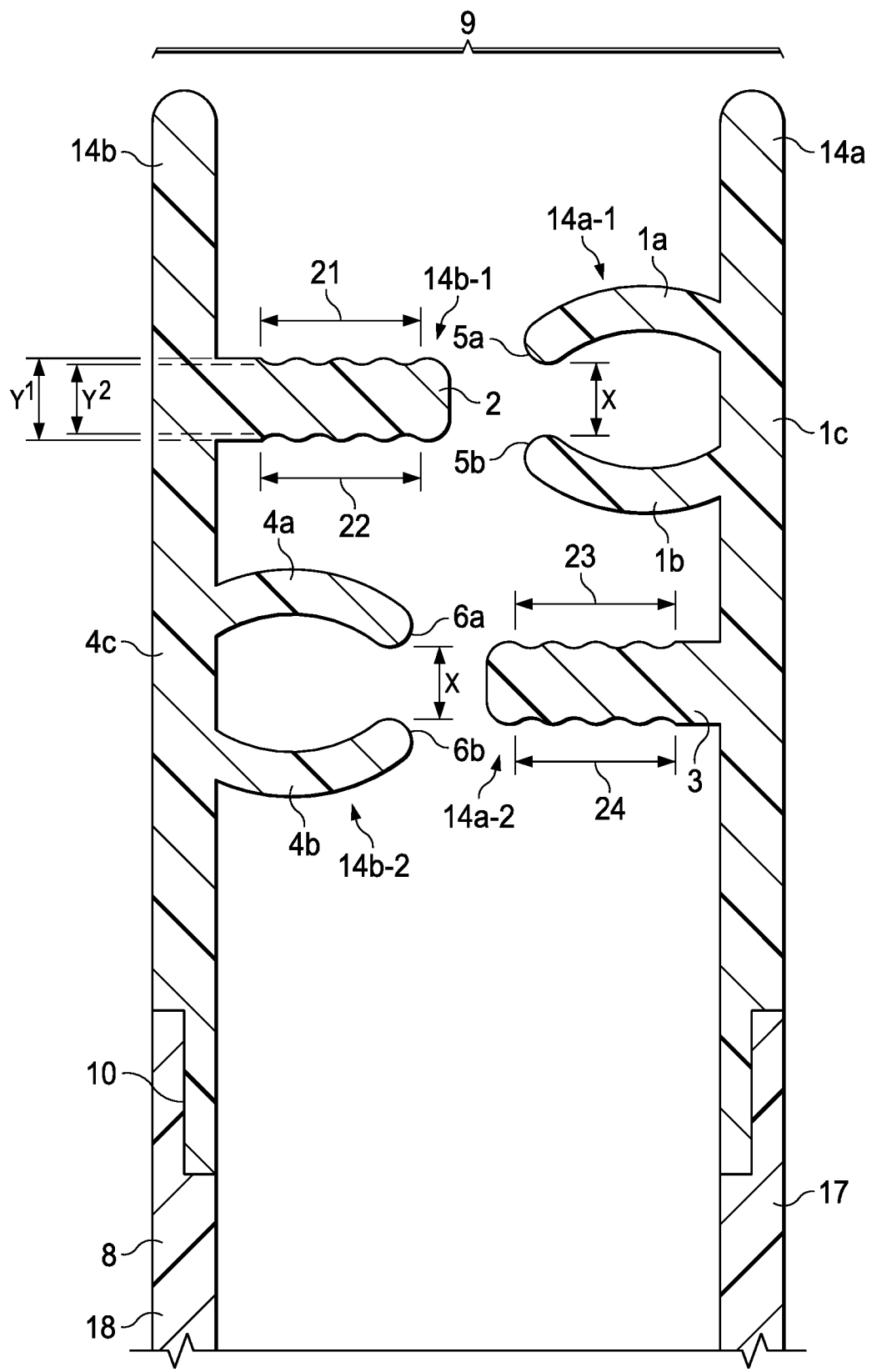
FIG. 2a depicts a diagrammatic representation of a partial, enlarged cross-sectional view of the double-locking closure mechanism of FIG. 1 in a non-occluded state, taken generally along the line 2-2 of FIG. 1.
Figure 2B:
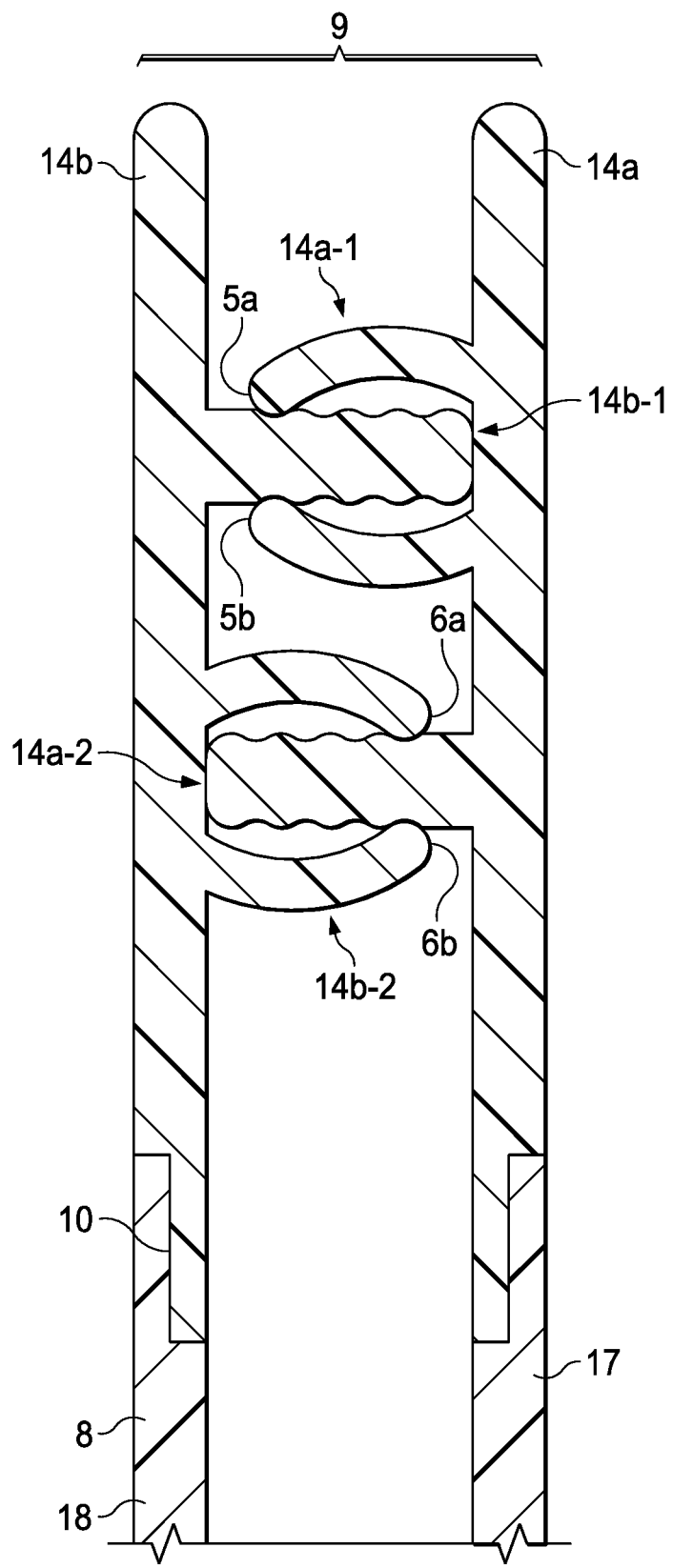
FIG. 2b depicts a diagrammatic representation of a partial, enlarged cross-sectional view of the double-locking closure mechanism of FIG. 2a in an occluded state.

FIG. 2a and FIG. 2b respectively depict closure mechanism 9 in a non-occluded state and an occluded state. Referring to FIG. 2a, channel 14a-1 of first closure element 14a may have a first locking profile with arms 1a-1b extending from body 1c, while elongated member 14b-1 of second closure element 14b may have a second locking profile with stud 2 extending from body 4c of second closure element 14a. Stud 2 may have a textured surface such as bumps, grooves, or crosswise grooves and may be configured and sized to be securely received by arms 1a-1b. The textured surface, size, and/or shape of stud 2 and arms 1a-1b may be configured to provide a tactile sensation and/or audible sensations, such as a series of clicks, as a user draws the fingers along closure mechanism 9 to seal opening 19 of storage bag 15 along the length of closure mechanism 9.

First closure element 14a may further include a third locking profile with stud 3 extending from body 1c and second closure element 14b may further include a fourth locking profile with arms 4a-4b extending from body 4c. Stud 3 may have a textured surface such as grooves and may be configured and sized to be securely received by arms 4a-1b.

As shown in FIG. 2b, when coupled, first closure element 14a and second closure element 14b form a double lock for closure mechanism 9, with elongated member 14b-1 of second closure element 14b securely received by channel 14a-1 of first closure element 14a and elongated member 14a-2 of first closure element securely received by channel 14b-2 of second closure element 14b in a complementary manner. Those skilled in the art will appreciate that the configuration and geometry of first and second closure elements 14a, 14b and their respective locking profiles may vary from implementation to implementation. Therefore, the example embodiment of first closure element 14a and second closure element 14b shown in FIG. 2a and FIG. 2b is illustrative and non-limiting.

Furthermore, in this example embodiment, first closure element 14a and first sidewall 17 may be joined, overlapping edge to edge, or otherwise affixed to each other using a thermoplastic weld, a strip of molten thermoplastic weld material, an adhesive, or any material and/or joining methods known to those skilled in the art to form seam 10 along the base of the first closure element 14a, as shown in FIG. 2a. Second closure element 14b and second sidewall 18 may be joined, overlapping edge to edge, or otherwise affixed to each other in the same or similar manner along the base of the second closure element 14b, as shown in FIG. 2a. In one embodiment, seam 10 may have a minimum measurement such as 3 mm or approximately 3 mm.

As shown in FIG. 2a and FIG. 2b, first sealing and locking section 21, 22 is disposed on elongated member 14b-1 of second closure element 14b and second sealing and locking section 23, 24 is disposed on elongated member 14a-2 on first closure element 14a. Elongated member 14b-1 of second closure element 14b and elongated member 14a-2 of first closure element 14a are shown to have the widest pressure point $Y^1$ and the narrowest locking point $Y^2$. First pressure contact points 5a and 5b of channel 14a-1 and second pressure contact points 6a and 6b of channel 14b-2 may define a distance of X which is to never be greater than $Y^2$ in order to have a proper securement of first and second closure elements 14a, 14b to create a waterproof seal. As a non-limiting example, X may be 0.7 mm and $Y^2$ may be 0.8 mm.

As shown in FIG. 1, in some embodiments, first and second sidewalls 17, 18 may be joined and double-sealed around three edges or sides 16a-16c. This may be done using plastic welding. Plastic welding refers to a process of uniting polymeric materials, generally with the aid of heat or any suitable conductive element. Welding of thermoplastics can be accomplished by first preparing the surfaces of the materials, applying heat and/or pressure to the materials, and allowing the materials to cool. Other welding methods may also be used.

Figure 3:
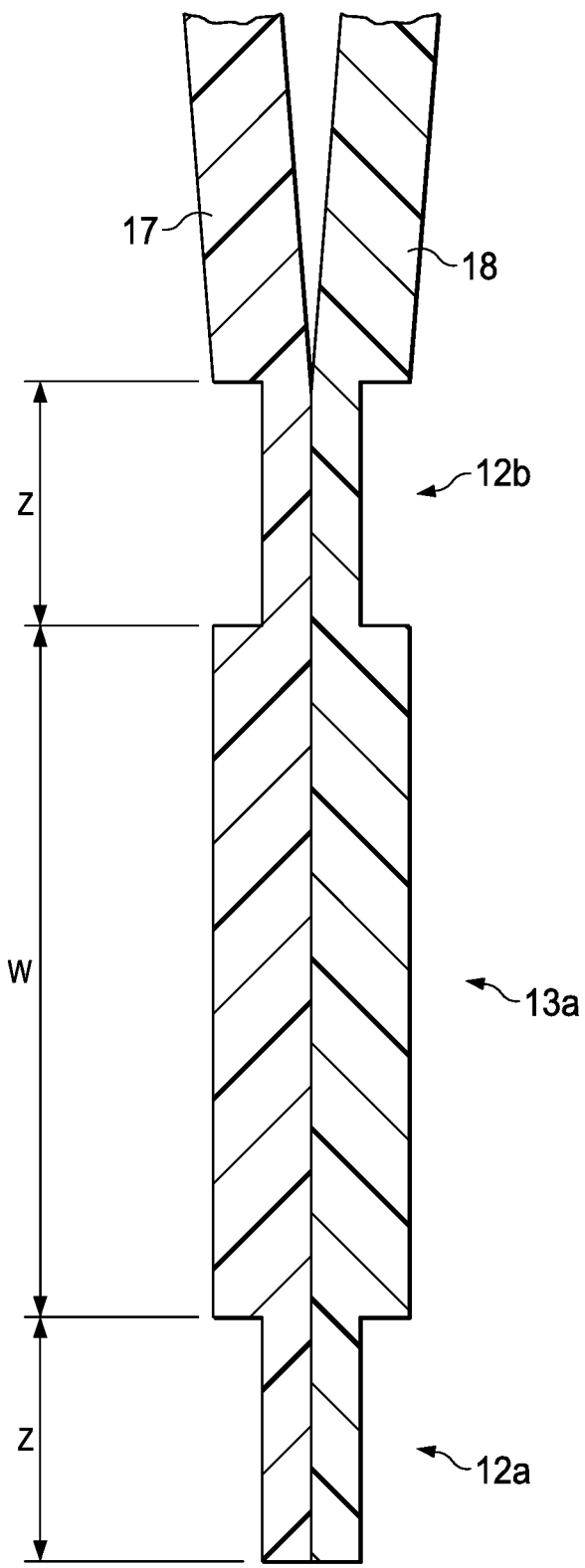
FIG. 3 depicts a diagrammatic representation of a partial, enlarged cross-sectional view of a double-sealed edge of FIG. 1, taken generally along the line 3-3 of FIG. 1.

Referring to FIG. 3, in some embodiments, double welded seams or seals 12a, 12b may have a minimum width of Z. In some embodiment, reinforcement section or gusset 13a between double seals 12a and 12b may have a width of W where W is approximately no less than three times Z such that double seals 12a and 12b formed on three sides of storage bag 15 are parallel or substantially parallel to each other as shown in FIG. 1. As a non-limiting example, Z may be 0.3 mm and W may be 0.9 mm or more. In one embodiment, gusset 13a may have a width of 2 mm or approximately 2 mm.

Figure 4:
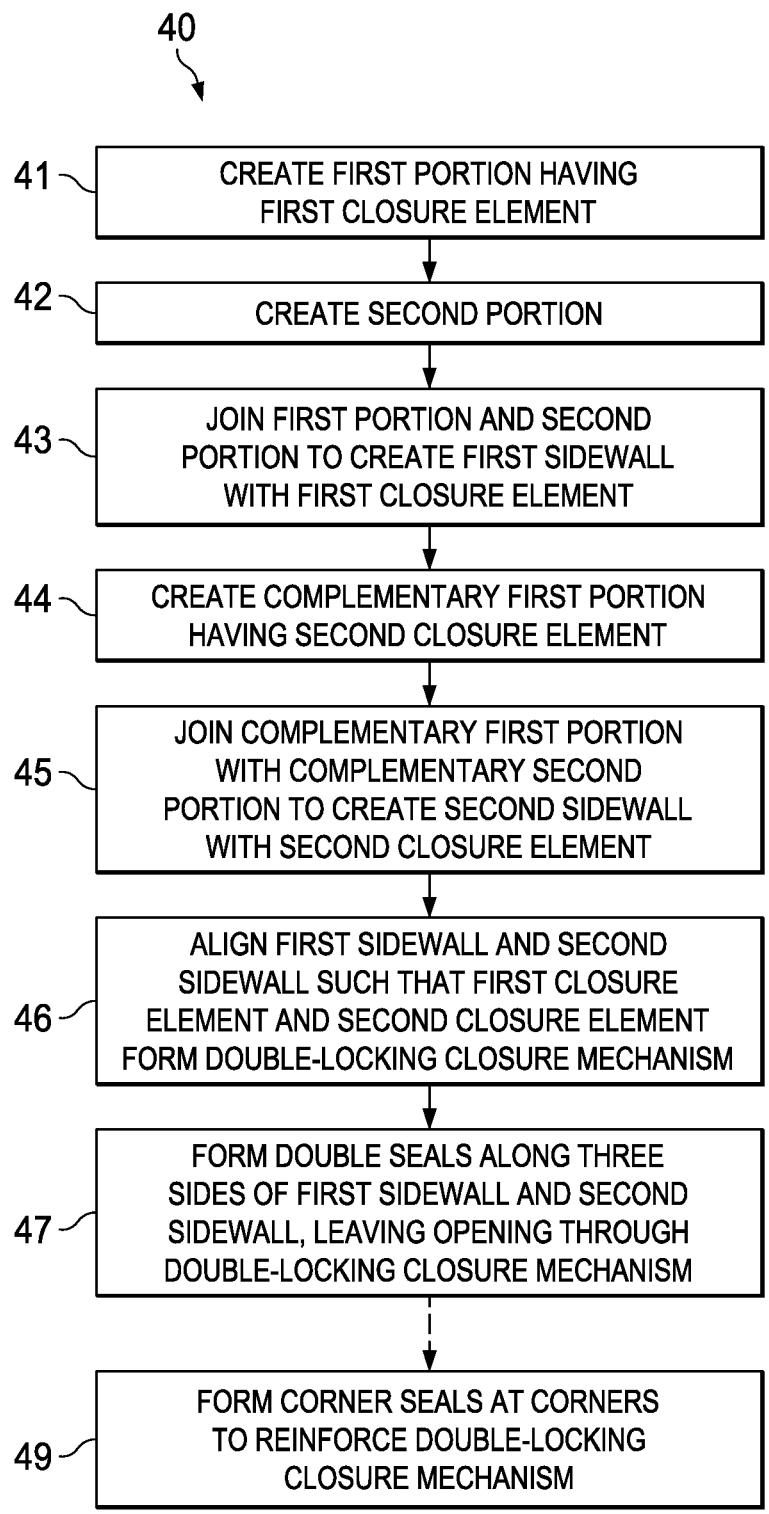
FIG. 4 is a flow chart illustrating an example of a method for making a versatile storage bag according to some embodiments.

FIG. 4 is a flow chart illustrating an example of a method for making a versatile storage bag according to some embodiments. In some embodiments, method 40 may include creating a portion having a first closure element (41), creating a second portion (42), and joining the first portion and the second portion to create a first sidewall with the first closure element (43). The first closure element may have a channel and an elongated member similar to channel 14a-1 and elongated member 14a-2 described above with reference to FIGS. 2a and 2b.

These steps may be repeated to create a second sidewall with a second closure element. The closure element may have a channel and an elongated member similar to elongated member 14b-1 and channel 14b-2 described above with reference to FIGS. 2a and 2b. Since the second closure element may be complementary to the first closure element, the same tool and/or mold may be used to create both the first portion having the first closure element and a complementary first portion having the second closure element that is complementary to the first closure element (44). Likewise, the same tool and/or mold may be used to make the second portion and a complementary second portion. The complementary first portion may be joined with the complementary second portion in the same or similar manner to create the second sidewall with the second closure element (45).

The first sidewall and the second sidewall may be aligned (46) such that the first closure element and the second closure element together can form a double-locking closure mechanism similar to closure mechanism 9 described above. Once properly aligned, a double-seal such as double-seal 12 described above can be formed (e.g., using a sealing tool) along three sides of the first and second sidewalls, leaving an opening through the double-locking closure mechanism (47).

If desired, corner seals can be formed at the corners to reinforce the double-locking closure mechanism (49). Specifically, a first corner seal may be created at a first corner of the first sidewall and the second sidewall, the first corner seal reinforcing a first end of the double-locking closure mechanism and a second corner seal may be created at a second corner of the first sidewall and the second sidewall, the second corner seal reinforcing a second end of the double-locking closure mechanism.

In some embodiments, the first portion, the second portion, and their complementary first and second portions may be made of a thermoplastic material. Examples of suitable thermoplastic materials may include polypropylene (PP), ethylene vinyl acetate (EVA), polyethylene (PE), metallocene-polyethylene (mPE), low density polyethylene (LDPE), linear low density polyethylene (LLDPE), ultra-low density polyethylene (ULDPE), biaxially-oriented polyethylene terephthalate (BPET), high density polyethylene (HDPE), polyethylene terephthalate (PET), recycled polyethylene terephthalate (RPET), polyethylene vinyl acetate (PEVA) among other polyolefin plastomers and combinations and blends thereof. Other additives such as colorants, slip agents, and antioxidants, including for example talc, oleamide or hydroxyl hydrocinnamate may also be added as desired.

Embodiments of a versatile storage bag disclosed herein preferably are made of a food grade material which is Food and Drug Administration (FDA) approved, Bisphenol A (BPA) free, flexible, freezer safe (e.g., cold resistant up to the operating temperature of a typical freezer such as 20 degrees Fahrenheit), heat resistant and dishwasher safe (e.g., heat resistant up to the operating temperature of a typical dishwasher such as 200 degrees Fahrenheit), lead-free, PVC-free, and/or hand wash safe.

In some embodiments, the first portion, the second portion, and their complementary first and second portions may be made of the same or different thermoplastic material(s). As an example, first sidewall 17 and second sidewall 18 of storage bag 15 shown in FIG. 1 may be made of a first type of thermoplastic material while double-locking closure mechanism 9 may be made of a second type of thermoplastic material. In some embodiments, the first type of thermoplastic material may have a thickness of about 0.25 mm to 0.35 mm, preferably about 0.30 mm. The second type of thermoplastic material may have the same or different thickness.

In some embodiments, a thermoplastic material may be EVA or a PEVA blend of EVA and PE. The PEVA blend may comprise 1% to 10% of PE and 99% to 90% of EVA. The ratio of EVA to PE in a PEVA blend determines its stiffness/flexibility. The stiffness of the material may affect how easily the double-locking closure mechanism may be closed/opened. Thus, the ratio of EVA to PE in a PEVA blend may vary from application to application, depending upon what degree of flexibility/stiffness is desired. The heat resistance property of a PEVA blend may be manipulated in a similar manner. For example, a PEVA blend with 99% EVA and 1% PE may have high tear resistance and heat resistance, while a PEVA blend with 70% EVA and 30% PE may be softer, but with less tear resistance and less heat resistance. In some embodiments, a PEVA blend of 90% EVA and 10% PE may provide a non-chlorine PVC alternative to food grade storage bags as PVC is not a food grade material. PEVA bonds to another material that is made out of either PE or EVA. Thus, some embodiments of a versatile storage bag disclosed herein can be formed from any combination of PEVA, EVA, and PE materials.

In some embodiments, an organic thermoplastic polymer such as polyether ether ketone (PEEK) may be used. PEEK melts around 343° C. (662° F.) and it is FDA approved food grade material. Since it is relatively stiff, a blend of PEEK including another material or materials may be used. For PEEK, the thinnest laminate thickness the industry currently has is 1 millimeter thick. The thinnest silicon laminate available is even thicker than the thinnest PEEK laminate. In some embodiments, a blend or composition including a 50% PEEK, a 48% EVA, and a 2% PE material may be used. In another blend, a ratio can be 40:20:40 with PEEK added for high heat resistance, EVA added for flexibility and durability, and PE added for flexibility.

In dishwasher safe embodiments, 100% silicon material or a different suitable blend or a different suitable material may be used. Injection molding processes may be used in manipulating a silicon material.

In some embodiments, a versatile storage bag disclosed herein can be formed from high-density polyethylene (HDPE) or polyethylene high-density (PEHD) which is a polyethylene thermoplastic. HDPE may be made into film (sheets) and bonded to silicon or other plastics or to acrylic etc.

In some embodiments, aesthetics (the look and feel) of a versatile storage bag disclosed herein may be varied by using and/or blending certain materials. For example, the first type of thermoplastic material may be formed such that first sidewall 17 and second sidewall 18 of storage bag 15 shown in FIG. 1 are partially transparent or appear translucent. Alternatively, first and second sidewalls 17, 18 may be made opaque by adding a coloring agent to the blend or by changing ratios of materials in the blend. Likewise, double-locking closure mechanism 9 may be made transparent, opaque, translucent, and/or colored.

As an example, a thermoplastic resin may be directed through an extrusion tool having a mold for forming the first closure element. The extruded part may be cut to size to create the first portion. The complementary first portion may be extruded in the same or similar manner. In some embodiments, the first portion (with the first closure element) and the complementary first portion (with the second closure element) may be extruded primarily of molten EVA with various amounts of slip component, colorant, and talc additives in a separate process.

In some embodiments, the first portion and the complementary first portion may be the same or substantially the same. In some embodiments, the first portion may have a height different than a height of the complementary first portion. For example, first closure element 14*a* on side 6 may be taller or shorter than second closure element 14*b* on side 7.

The same or a different thermoplastic material may be directed through a different extrusion tool (e.g., casting film machine) having a mold for forming a sheet or sheets (multi-ply) and then cut to size and/or shape to form the second portion. The second portion may have a first flat surface that eventually becomes part of the outside of the storage bag thus made and a second flat surface that eventually forms part of the interior space (e.g., interior space 20 shown in FIG. 1). In some embodiments, the first and second surfaces of the second portion may be the same or substantially the same. In some embodiments, the first and second surfaces of the second portion may be different. For example, the first and second surfaces of the second portion may be textured, colored, or otherwise treated differently. In some embodiments, the complementary second portion may be the same or substantially the same as the second portion. Referring to FIG. 1, in some embodiments, one or both sidewalls 17, 18 may be embossed or otherwise textured with a pattern, such as a diamond pattern, on one or both surfaces spaced between bottom edge 16*b* and closure mechanism 9.

Once they are made, the first portion and the second portion can be aligned and joined to form the first sidewall with the first closure element as described above. Likewise, the complementary first portion and the complementary second portion can be aligned and joined to form the second sidewall with the second closure element. In some embodiments, radio frequency (RF) welding may be used. RF welding applies electricity as a heat element to melt a positive and a negative charge. RF welding is considered the least expensive type of welding and the fastest one to manufacture the storage bag described above. Other tools such as a sealing tool may be used.

The first sidewall and the second sidewall are then aligned and a sealing tool may be applied to create a double-seal along three sides of the first sidewall and the second sidewall, leaving an opening through the double-locking closure mechanism. To reinforce, a corner seal may be created (e.g., using RF welding via a heat-molded stamp) at each corner of the double-locking closure mechanism. Each corner seal is sized to accommodate the height, width, and depth of the ends of the double-locking closure mechanism. As an example, a corner seal may be 3 millimeters in height, 4 to 4½ millimeters in depth, and 9 millimeters in width to accommodate the width of the double-locking closure mechanism such that the ends of the double-locking closure mechanism are securely sealed. The thickness of the corner seals may be the same as the thickness of the double-locking closure mechanism when it is closed.

Figure 5D:
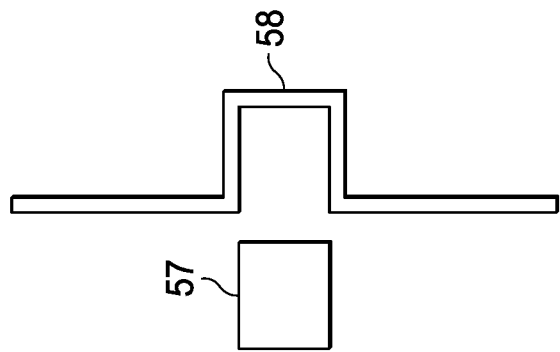
FIGS. 5a-5d depict diagrammatic representations of various corner seal profiles and corresponding stamps or molds used in manufacturing same according to some embodiments.
Figure 5C:
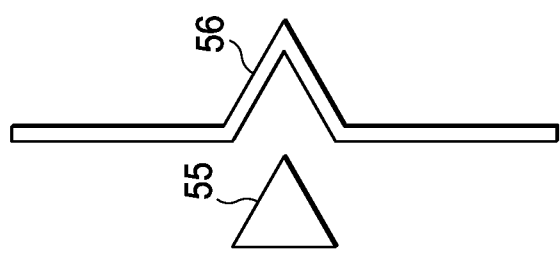
Figure 5B:
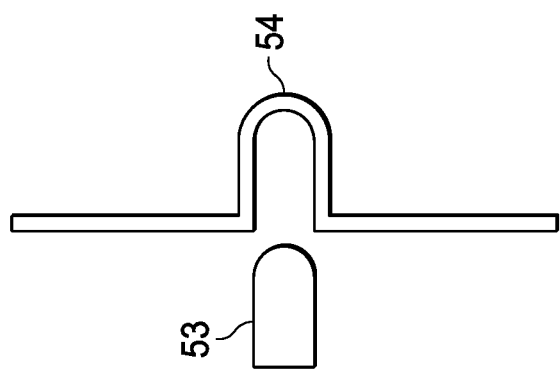
Figure 5A:
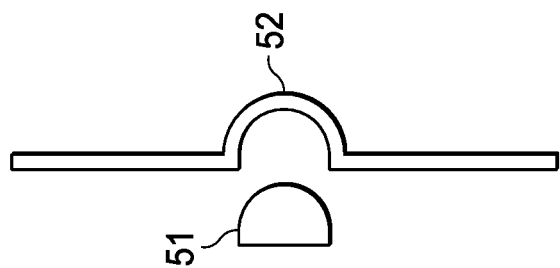

Referring to FIG. 1, in some embodiments, corner seals 11*c*, 11*d* may have a particular profile created with a corresponding tooling for a specific application. FIGS. 5*a*-5*d* depict diagrammatic representations of various corner seal profiles and corresponding molds used in manufacturing same according to some embodiments. More specifically, FIG. 5*a* depicts an example of half-moon corner seal profile 51 and corresponding half-moon shaped mold or stamp 52. FIG. 5*b* depicts another example of half-elliptical corner seal profile 53 and corresponding mold or stamp 54. FIG. 5*c* depicts yet another example of triangular corner seal profile 55 and corresponding mold or stamp 56. FIG. 4*d* depicts an example of square corner seal profile 57 and corresponding mold or stamp 58. Numerous other corner seal profiles are also possible. Preferably, corner seals 11*c*, 11*d* are formed to have half-moon corner seal profile 51. An example portion of half-moon shaped mold or stamp 52 is shown in FIG. 6.

Figure 6:
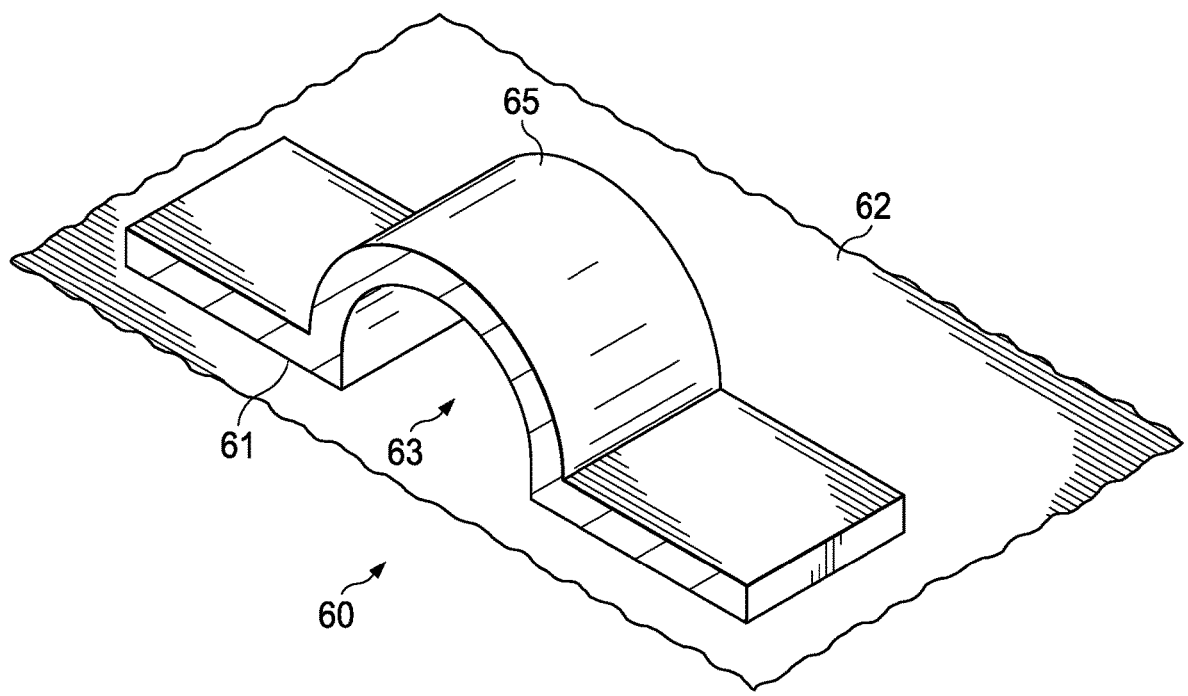
FIG. 6 depicts a diagrammatic representation of a portion of a tooling for forming a corner seal of a versatile storage bag according to some embodiments.

Referring to FIG. 6, a corner seal may be created using stamp or mold 60 having half-moon shaped cavity 65 arising out of flat surface 61. In this example, the back side of half-moon shaped cavity 65 is cutoff to show a cross-sectional view of mold 60. Mold 60 may be referred to as a top plate. In some embodiments, mold 60 may be part of a tool such as corner seal reinforcement mold portion 112 of tool 110 shown in FIG. 11. When positioned on top of a base plate having a flat surface such as table 62, mold 60 can create space 63 having a corner seal profile such as half-moon corner seal profile 51 shown in FIG. 5*a*. In an RF tooling process, the top plate is kept at one charge and the base plate is kept at a different charge. The RF tooling process passes the charge through the material. Referring to FIG. 1, to form half-moon corner seal 11*c*, arc-shaped stamp 60 may be pressed down onto corner 11*a* where both sidewalls 17, 18 meet an end of double-locking closure mechanism 9. The pressure pushes the heated material to fill space 63, forming a bubble. In some embodiments, additional material may be injected or otherwise provided to fill space 63, ensuring a good seal. This stamping process of the corners (e.g., corners 11*a*, 11*b* shown in FIG. 1) creates a strong, permanent bonding between the ends of the first and second closure elements, the seam between the double-locking closure mechanism and the sidewalls, and the ends of the double-seal, some examples of which are illustrated in FIGS. 8*a*-8*d*.

Figure 7:
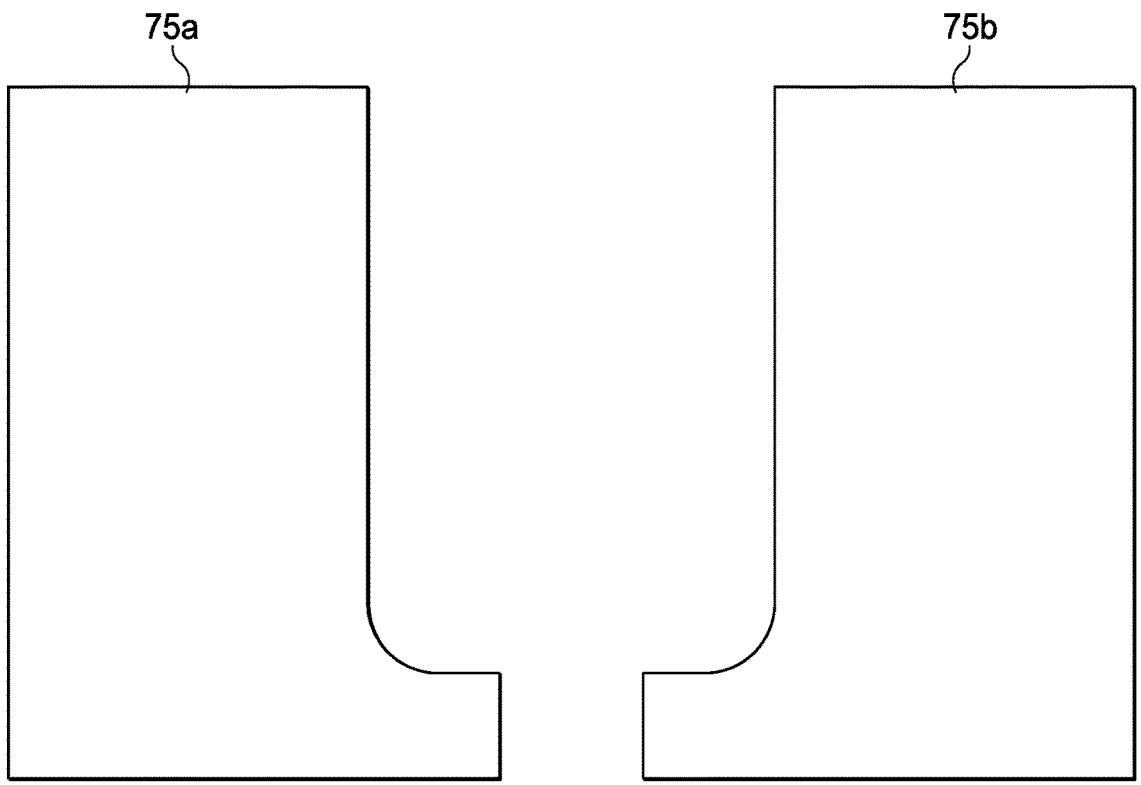
FIG. 7 depicts a diagrammatic representation of a pair of L-shaped corner profiles according to some embodiments.

As a result of the stamping process, these corners may have a particular corner profile such as L-shaped corner profile 75*a*, 75*b* shown in FIG. 7. Depending upon implementation details, other corner profiles may also be possible, as exemplified in FIGS. 8*a*-8*d*.

FIGS. 8*a*-8*d* illustrate various corner profiles that may be formed at a corner of a versatile storage bag (e.g., corner 11*a* of versatile storage bag 15 shown in FIG. 1) according to some embodiments.

Figure 8A:
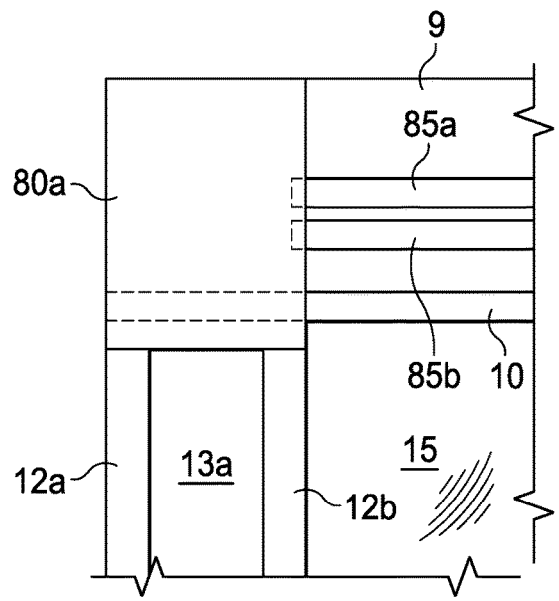
FIGS. 8a-8d depict diagrammatic representations of different corner configurations according to some embodiments.

In FIG. 8*a*, a partial view of one embodiment of versatile storage bag 15 is shown. In this example, double-locking closure mechanism 9 has first lock 85*a* (e.g., when channel 14*a*-1 of first closure element 14*a* is interlocked with elongated member 14*b*-1 of second closure element 14*b*, as shown in FIG. 2*b*) and second lock 85*b* (e.g., when elongated member 14*a*-2 of first closure element 14*a* is interlocked with channel 14*b*-2 of second closure element 14*b*, as shown in FIG. 2*b*). Corner 80*a* is formed (e.g., via a stamping process described above) to securely seal and permanently bond the ends of first lock 85*a* and second lock 85*b* of double-locking closure mechanism 9, seam 10, and the ends of seals 12*a*, 13*b*, further reinforcing gusset 13*a*. In this example, corner 80*a* has a box-shaped (rectangle or square) corner profile.

Figure 8B:
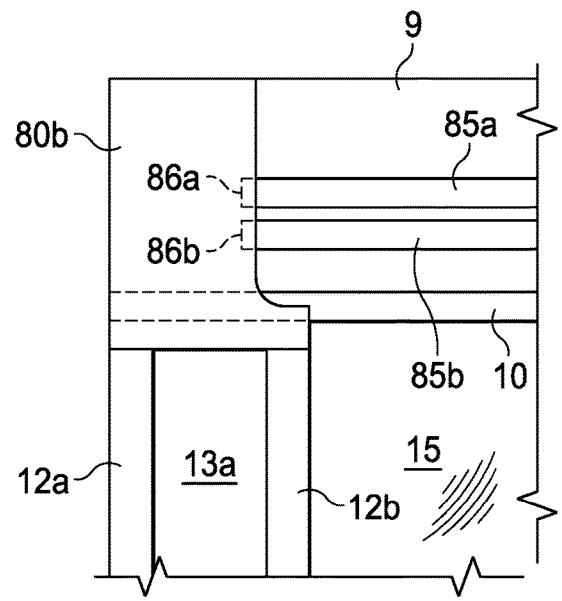

In FIG. 8*b*, a partial view of one embodiment of versatile storage bag 15 is shown. In this example, corner 80*b* has an L-shaped corner profile, with ends 86*a*, 86*b* of first lock 85*a* and second lock 85*b* extending into corner 80*b* beyond seal 12*b*. In some cases, the L-shaped corner profile of corner 80*b* may be caused by a slight shifting of versatile storage bag 15 during manufacturing, for instance, as the corner stamping tool is used repeatedly and/or when versatile storage bag 15 may not be positioned inside an edge tool correctly. Due to continuous use of the tools, heat may be generated, causing expansion of the tools which, in turn, affects the precision profile of corner 80*b*. However, as illustrated in FIG. 8*b*, the L-shaped corner profile of corner 80*b* is within the manufacturing tolerance, allowing corner 80*b* to securely seal and permanently bond ends 86*a*, 86*b* of first lock 85*a* and second lock 85*b* of double-locking closure mechanism 9, seam 10, and the ends of seals 12*a*, 13*b*, further reinforcing gusset 13*a*.

In some embodiments, the ends of first lock 85a and second lock 85b of double-locking closure mechanism 9 may be further reinforced via a corner seal. This is further illustrated in FIGS. 8c and 8d.

Figure 8C:
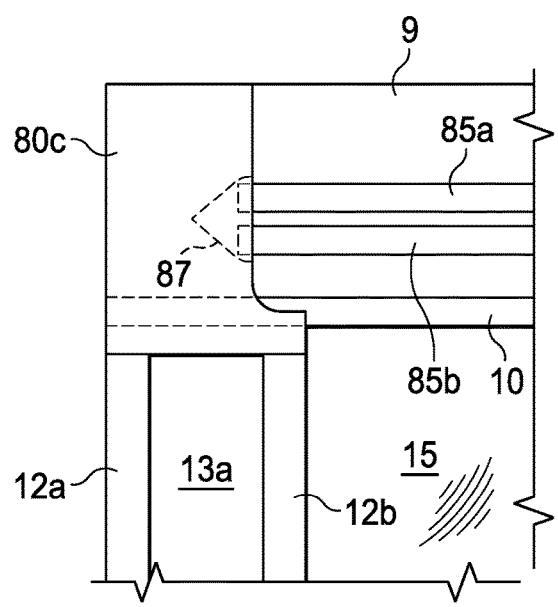

In FIG. 8c, corner seal 87 may be formed simultaneously with corner 80c or in a separate process after corner 80c is stamped down. As described above and illustrated in FIGS. 5a-5d, such a corner seal may have various shapes and sizes. In this example, corner seal 87 is formed with a triangular stamp or mold. One of the advantages of this corner seal reinforcement feature is that it can avoid micro-fissures at the link or seal point between sides 6 and 7 of versatile storage bag 15. Such micro-fissures can cause leaking. Such leaking can be presented by forming corner seal 87 around the ends of first lock 85a and second lock 85b, as illustrated in FIG. 8c.

Figure 8D:
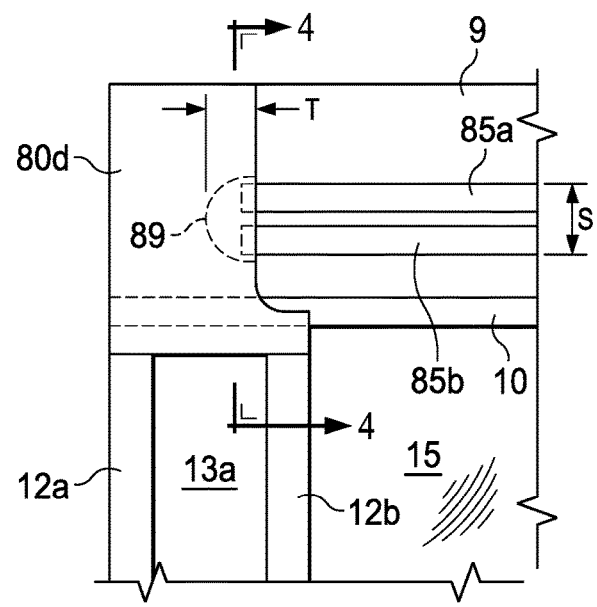

FIG. 8d illustrates another example of corner seal 89. Corner seal 89 may have a half-moon profile with a depth "T" based on a width "S" defined by first lock 85a and second lock 85b. For example, "T" may be defined as "≥60% of S." In some embodiments, "S" may be 7 mm or approximately 7 mm.

Figure 9:
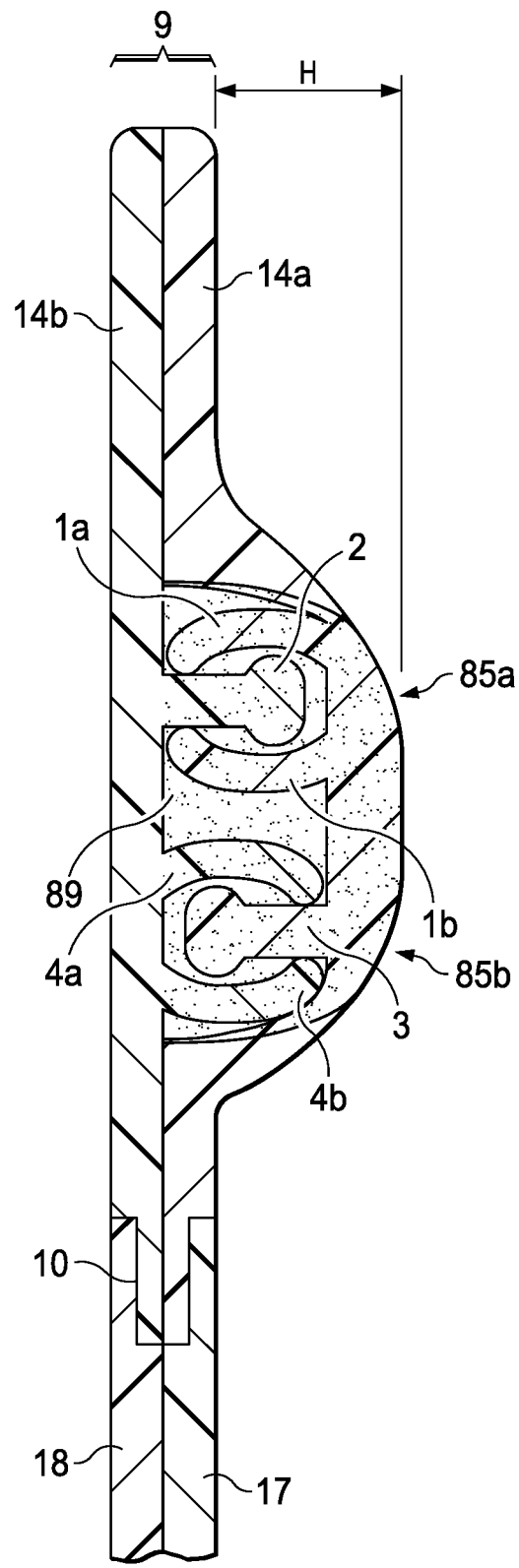
FIG. 9 depicts a diagrammatic representation of a partial, enlarged cross-sectional view of a corner portion of one example embodiment of a versatile storage bag, taken generally along the line 4-4 of FIG. 8d.

A partial, enlarged cross-sectional view of corner seal 89, taken generally along the line 4-4 of FIG. 8d, is shown in FIG. 9. In this example, corner seal 89 may have a cross-sectional height of "H" defined by a tool such as arc-shaped stamp 60 shown in FIG. 6. In one embodiment, "H" may be defined by space 63 of arc-shaped stamp 60. FIG. 9 shows another embodiment of studs 2 and 3 having a shape and/or texture that is different from the example shown in FIGS. 2a and 2b.

Figure 10:
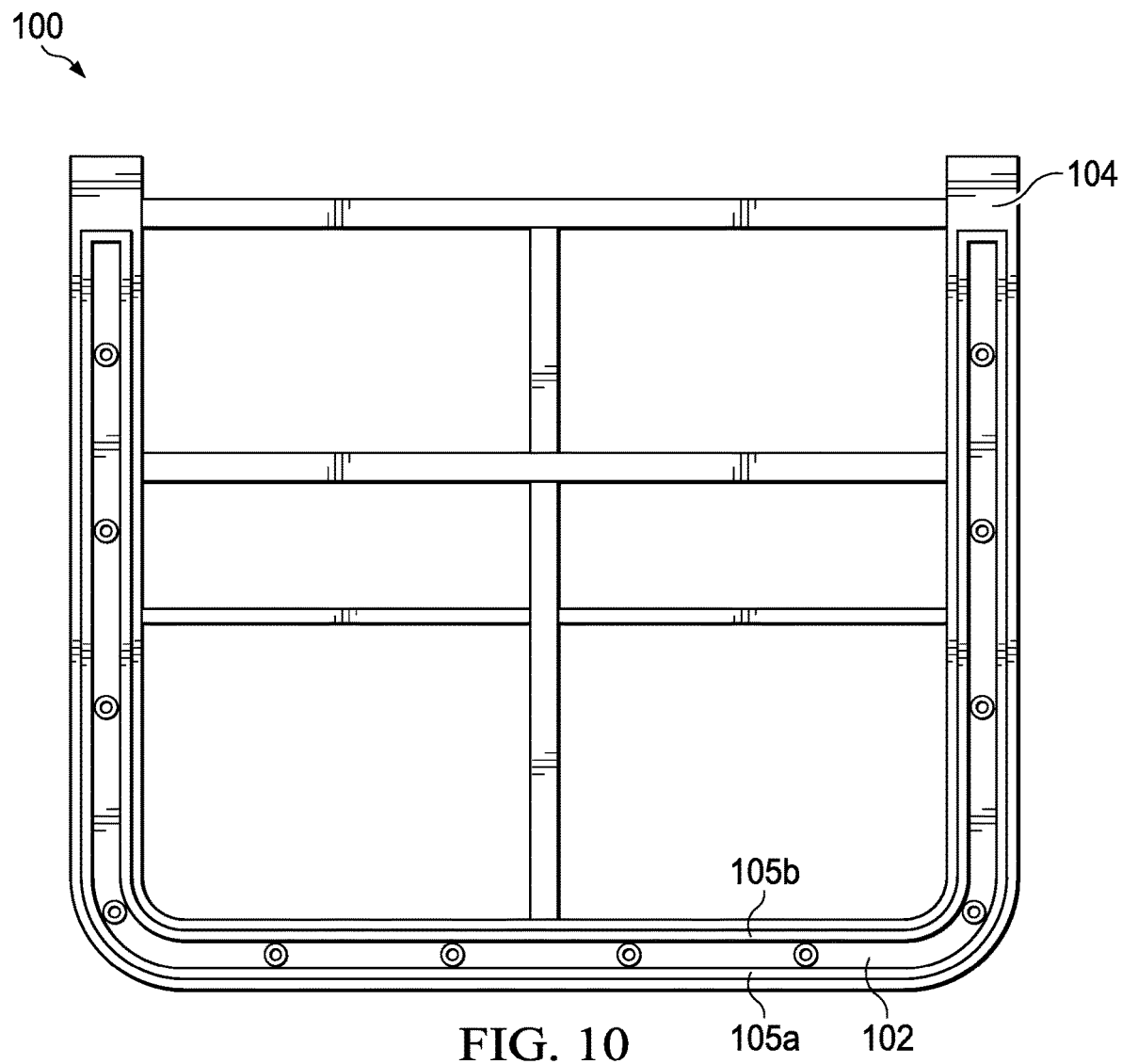
FIG. 10 depicts a diagrammatic representation of a tooling for making double seals along the edges of a versatile storage bag according to one embodiment.

FIG. 10 depicts a diagrammatic representation of a tooling for making double seals along the edges of a versatile storage bag according to one embodiment. In this example, tool 100 can be made of metal and include double-edge seam mold portion 102 having first and second edge seal molds 105a, 105b. Tool 100 may further include corner stamp area 104. In one embodiment, tool 100 may be used to create seals 12a, 12b, gusset 13a, and corner 80a shown in FIG. 8a. To create a corner seal, a separate machine or device such as tool 110 shown in FIG. 11 may be used.

Figure 11:
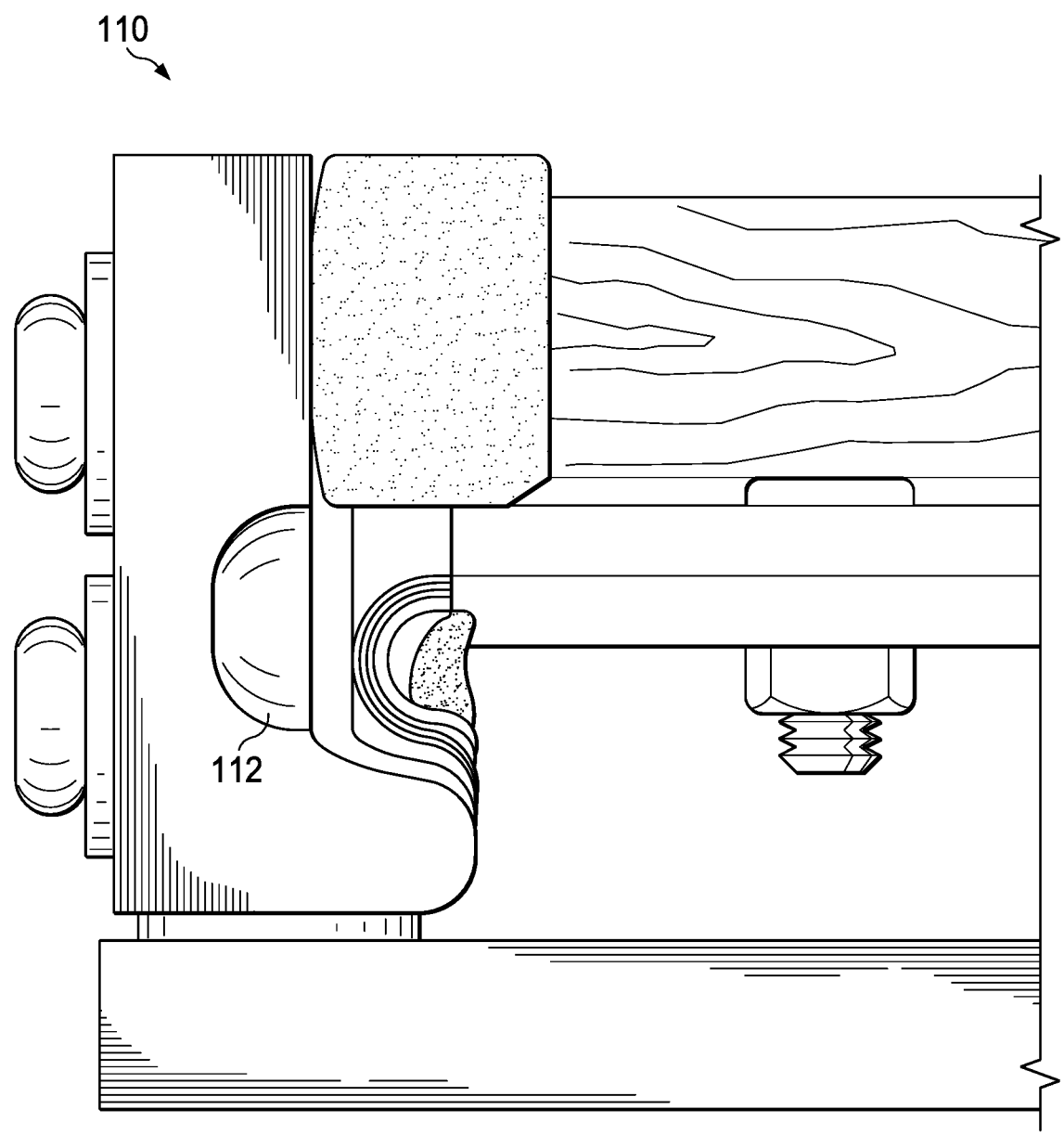
FIG. 11 depicts a diagrammatic representation of a tooling for reinforcing a corner of a double-locking closure mechanism of a versatile storage bag with a particularly configured corner seal according to one embodiment.

FIG. 11 depicts a diagrammatic representation of a tooling for reinforcing a corner of a double-locking closure mechanism of a versatile storage bag with a particularly configured corner seal according to one embodiment. In this example, tool 110 includes corner seal reinforcement mold portion 112 having a half-moon, bowl, or dome-like profile.

Figure 12:
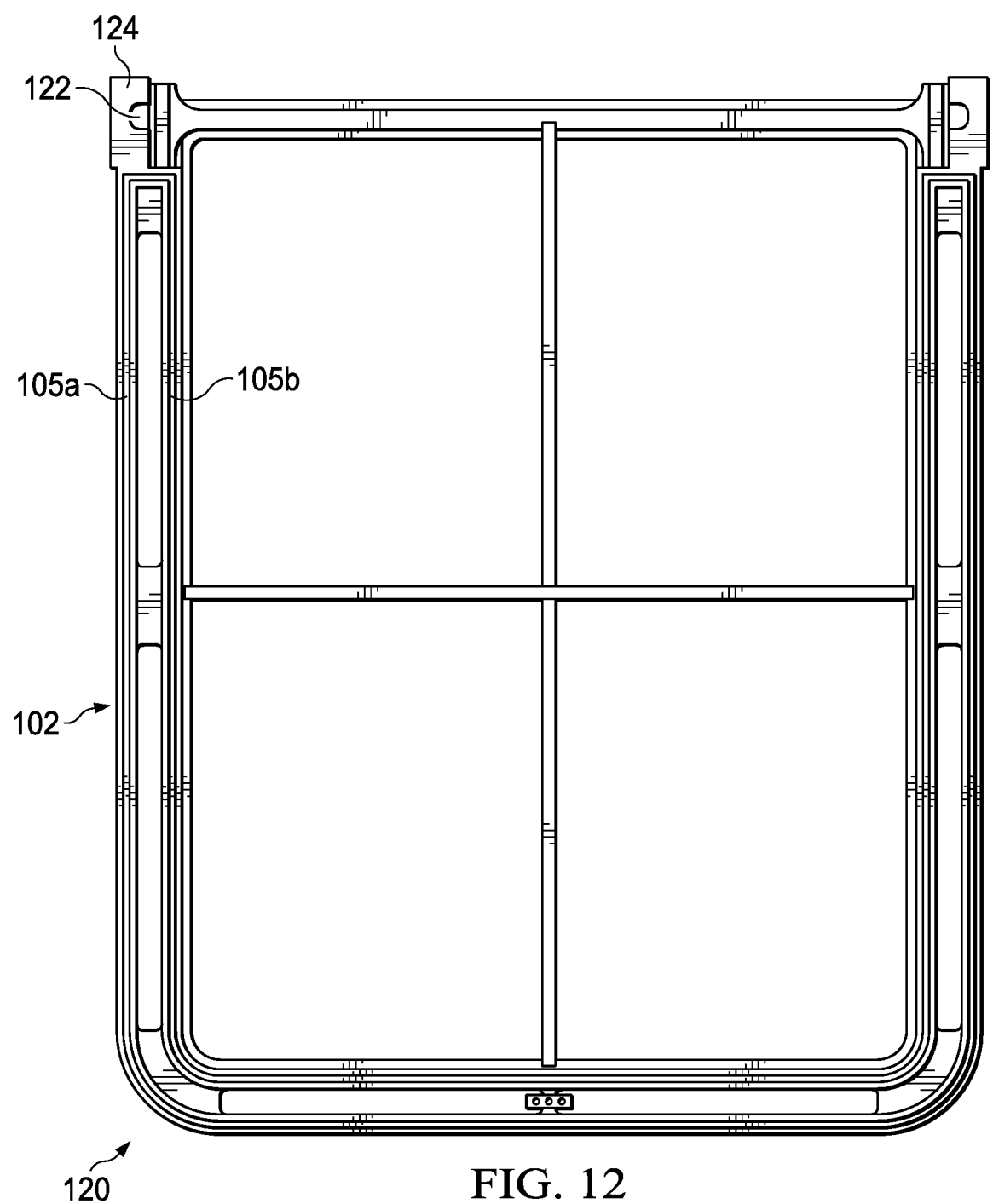
FIG. 12 depicts a diagrammatic representation of a tooling for manufacturing a versatile storage bag according to one embodiment.

In some embodiments, a single machine or device may be used to simultaneously create the seals (e.g., seals 12a, 12b), the gusset (e.g., gusset 13a), the corners (e.g., corners 11a, 11b), and the corner seals (e.g., corner seals 11c, 11d). FIG. 12 depicts a diagrammatic representation of such a device according to one embodiment. In this example, tool 120 includes double-edge seam mold portion 102 having first and second edge seal molds 105a, 105b similar to those of tool 100 described above for forming the seals and the gusset as described above. Tool 120 further includes corner stamp area 124 having corner seal reinforcement feature mold portion 122 for forming corners with corner seals as described above.

Figure 13:
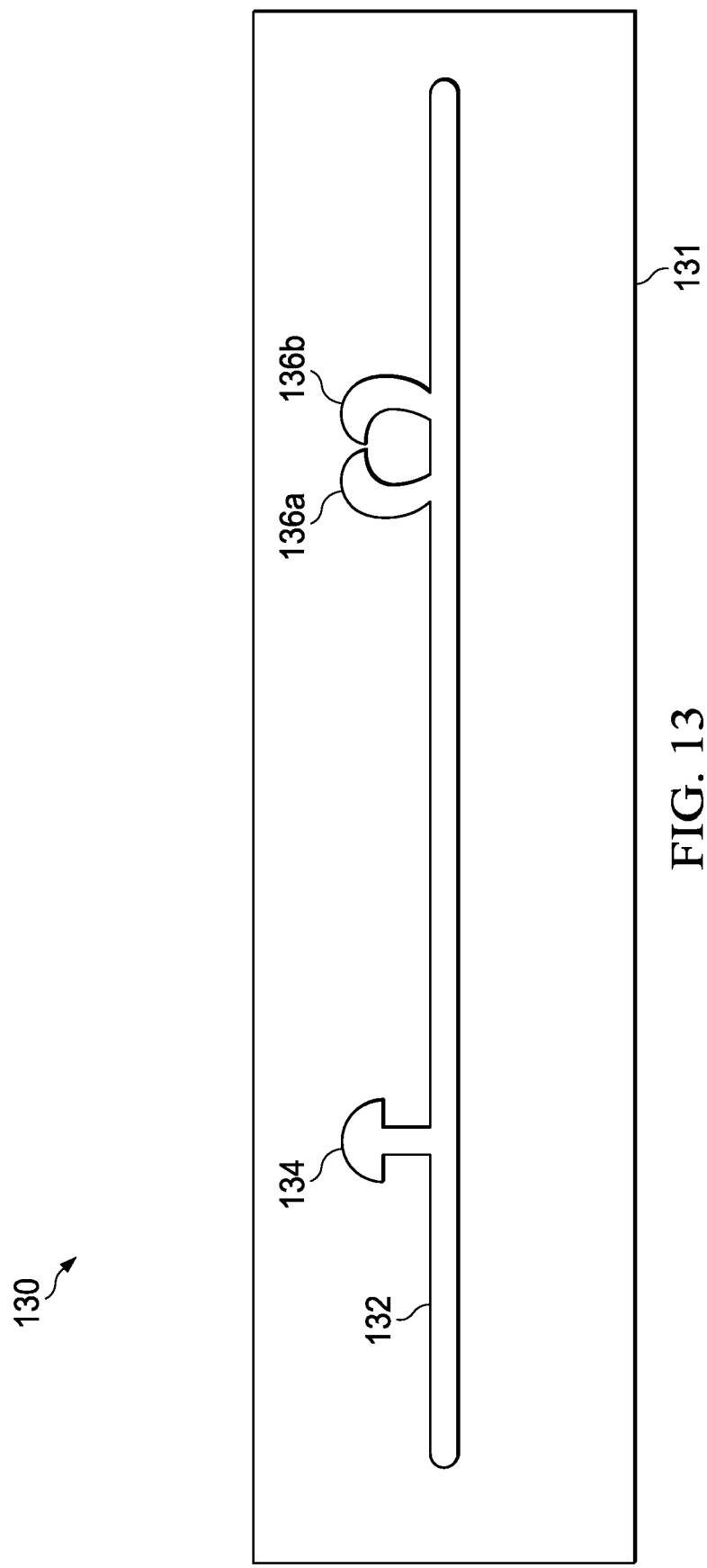
FIG. 13 depicts a diagrammatic representation of a tooling for manufacturing a double-locking closure mechanism of a versatile storage bag according to one embodiment.

FIG. 13 depicts a diagrammatic representation of a tooling for manufacturing a double-locking closure mechanism of a versatile storage bag according to one embodiment. In this example, tool 130 may include metal plate 131. Plate 131 has extrusion opening 132 with shaped forms or molds 134, 13a, and 136b. As an example, place 131 may be used to form first and second closure elements 14a, 14b described above. For example, an extrusion machine pushes or pumps a molten material from one side of extrusion opening 132 to form first and second closure elements 14a, 14b on the other side of extrusion opening 132. The extrusion process is known to those skilled in the art and thus is not further described herein. Other processes such as injection molding may also be used to form closure elements 14a, 14b.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. For example, color can be used on tabs at top of the double-locking closure mechanism to help create visual distinction from the rest of the storage bag, making it easier to identify the opening and unlock. Color can also be applied to the main storage element of the bag, in whole or part, to make it easier to see the contents and/or to distinguish from single use, disposable style bags. In addition, color can be used as an organizing element for packing food, identifying person, or keeping distinct for certain foods to address food allergies.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other assemblies, methods, components, materials, parts, and/or the like. In other instances, well-known structures, methods, components, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the disclosure should be determined by the following claims and their legal equivalents.

What is claimed is:

1. A storage bag, comprising:
a first sidewall consisting of a first portion and a second portion, the first portion having a first half of a double-locking closure mechanism, the second portion having a flat or substantially flat surface, the first portion and the second portion affixed edge to edge to each other, forming a seam along a base of the first half of the double-locking closure mechanism;
a second sidewall consisting of a complementary first portion and a complementary second portion, the complementary first portion having a second half of the double-locking closure mechanism, the complementary second portion having a flat or substantially flat surface, the complementary first portion and the complementary second portion affixed edge to edge to each other, forming a seam along a base of the second half of the double-locking closure mechanism; and
a double-seal traversing along three sides of the first sidewall and the second sidewall, leaving an opening through the double-locking closure mechanism, the double-seal comprising a gusset between the double-seal and also traversing along the three sides of the first sidewall and the second sidewall.

2. The storage bag of claim 1, further comprising:
a first seal joining a first corner of the first sidewall, a first corner of the second sidewall, and a first end of the double-locking closure mechanism; and
a second seal joining a second corner of the first sidewall, a second corner of the second sidewall, and a second end of the double-locking closure mechanism.

3. The storage bag of claim 1, wherein the first portion and the second portion are affixed edge to edge to each other using a thermoplastic weld, a strip of molten thermoplastic weld material, or an adhesive.

4. The storage bag of claim 1, wherein the seam has a minimum measurement of 3 mm or approximately 3 mm.

5. The storage bag of claim 1, wherein the first half of the double-locking closure mechanism has a channel and an elongated member extending along the base of the first half of the double-locking closure mechanism, wherein the second half of the double-locking closure mechanism has an elongated member and a channel extending along a base of the second half of the double-locking closure mechanism.

6. The storage bag of claim 5, wherein each elongated member of the double-locking closure mechanism has a sealing and locking section.

7. The storage bag of claim 5, wherein the elongated member of the first half of the double-locking closure mechanism has a narrowest locking point, wherein the channel of the first half of the double-locking closure mechanism has pressure contact points, wherein the pressure contact points define a channel opening that is not greater than the narrowest locking point of the elongated member of the first half of the double-locking closure mechanism.

8. The storage bag of claim 1, wherein the double-seal has a minimum width and wherein the gusset has a width that is approximately not less than three times the minimum width of the double-seal.

9. The storage bag of claim 1, wherein the first portion and the second portion are made of same thermoplastic material.

10. The storage bag of claim 1, wherein the first portion and the second portion are made of different thermoplastic materials.

11. A storage bag, comprising:
a first sidewall consisting of a first portion and a second portion, the first portion having a first half of a double-locking closure mechanism, the second portion having a flat or substantially flat surface, the first portion and the second portion affixed edge to edge to each other, forming a seam along a base of the first half of the double-locking closure mechanism;
a second sidewall consisting of a complementary first portion and a complementary second portion, the complementary first portion having a second half of the double-locking closure mechanism, the complementary second portion having a flat or substantially flat surface, the complementary first portion and the complementary second portion affixed edge to edge to each other, forming a seam along a base of the second half of the double-locking closure mechanism, wherein the first portion of the first side wall and the complementary first portion of the second side wall have different heights or widths; and
a double-seal traversing along three sides of the first sidewall and the second sidewall, leaving an opening through the double-locking closure mechanism, the double-seal comprising a gusset between the double-seal and also traversing along the three sides of the first sidewall and the second sidewall.

12. The storage bag of claim 11, further comprising:
a first seal joining a first corner of the first sidewall, a first corner of the second sidewall, and a first end of the double-locking closure mechanism; and a second seal joining a second corner of the first sidewall, a second corner of the second sidewall, and a second end of the double-locking closure mechanism, wherein the first seal, the second seal, and the double-locking closure mechanism have same thickness.

13. The storage bag of claim 12, wherein at least one of the first seal or the second seal has an L-shaped profile, a box-shaped profile, a half-elliptical shaped profile, or a half-moon shaped profile.

14. The storage bag of claim 11, wherein at least one of the first sidewall or the second sidewall is textured with a pattern.

15. The storage bag of claim 11, wherein the first half of the double-locking closure mechanism has an elongated member extending along the base of the first half of the double-locking closure mechanism, wherein the second half of the double-locking closure mechanism has a channel extending along a base of the second half of the double-locking closure mechanism.

16. The storage bag of claim 15, wherein the elongated member of the first half of the double-locking closure mechanism has a sealing and locking section and wherein the channel of the second half of the double-locking closure mechanism has an opening configured for receiving the sealing and locking section of the elongated member of the first half of the double-locking closure mechanism.

17. The storage bag of claim 15, wherein the elongated member of the first half of the double-locking closure mechanism has a narrowest locking point, wherein the channel of the second half of the double-locking closure mechanism has pressure contact points, wherein the pressure contact points define a channel opening that is not greater than the narrowest locking point of the elongated member of the second half of the double-locking closure mechanism.

18. The storage bag of claim 11, wherein the double-seal has a minimum width and wherein the gusset has a width that is approximately not less than three times the minimum width of the double-seal.

19. The storage bag of claim 11, wherein the first portion and the second portion are made of same thermoplastic material.

20. The storage bag of claim 11, wherein the first portion and the second portion are made of different thermoplastic materials.

* * * * *